United States Patent
Liu et al.

(10) Patent No.: US 11,288,796 B2
(45) Date of Patent: Mar. 29, 2022

(54) IMAGE PROCESSING METHOD, TERMINAL DEVICE, AND COMPUTER STORAGE MEDIUM

(71) Applicant: BEIJING SENSETIME TECHNOLOGY DEVELOPMENT CO., LTD., Beijing (CN)

(72) Inventors: Wentao Liu, Beijing (CN); Chen Qian, Beijing (CN); Qinqin Xu, Beijing (CN); Chen Chen, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 60 days.

(21) Appl. No.: 16/828,286

(22) Filed: Mar. 24, 2020

(65) Prior Publication Data

US 2020/0226754 A1 Jul. 16, 2020

Related U.S. Application Data

(63) Continuation of application No. PCT/CN2018/124359, filed on Dec. 27, 2018.

(30) Foreign Application Priority Data

May 31, 2018 (CN) .......................... 201810553047.9

(51) Int. Cl.
*G06T 7/00* (2017.01)
*G06T 7/13* (2017.01)
(Continued)

(52) U.S. Cl.
CPC .............. *G06T 7/0012* (2013.01); *G06T 7/13* (2017.01); *G06T 7/149* (2017.01); *G06T 9/20* (2013.01);
(Continued)

(58) Field of Classification Search
CPC ......... G06T 7/0012; G06T 7/13; G06T 7/149; G06T 9/20; G06T 2207/20116; G06T 2207/30004
See application file for complete search history.

(56) References Cited

U.S. PATENT DOCUMENTS

2008/0088712 A1  4/2008  Craig
2010/0030578 A1  2/2010  Siddique
(Continued)

FOREIGN PATENT DOCUMENTS

CN    104408702 A    3/2015
CN    104537608 A    4/2015
(Continued)

OTHER PUBLICATIONS

English Translation of the Written Opinion of the International Search Authority in the international application No. PCT/CN2018/124359, dated Mar. 27, 2019, 6 pgs.
(Continued)

*Primary Examiner* — Vu Le
*Assistant Examiner* — Julius Chai
(74) *Attorney, Agent, or Firm* — Cooper Legal Group, LLC

(57) ABSTRACT

An image processing methods includes: obtaining a first image, identifying a target object in the first image, and obtaining body detection information of the target object; obtaining first detection information related to a leg region of the target object in the body detection information; and performing image deformation processing on the leg region corresponding to the first detection information to generate a second image.

15 Claims, 3 Drawing Sheets

A first image is obtained, a target object in the first image is identified, and body detection information of the target object is obtained — 101

First detection information related to a leg region of the target object is obtained in the body detection information — 102

Image deformation processing is performed on the leg region corresponding to the first detection information to generate a second image — 103

(51) Int. Cl.
*G06T 7/149* (2017.01)
*G06T 9/20* (2006.01)

(52) U.S. Cl.
CPC ............... *G06T 2207/20116* (2013.01); *G06T 2207/30004* (2013.01)

(56) References Cited

U.S. PATENT DOCUMENTS

| | | |
|---|---|---|
| 2010/0177933 A1 | 7/2010 | Willmann |
| 2014/0081365 A1 | 3/2014 | Kane et al. |

FOREIGN PATENT DOCUMENTS

| | | | |
|---|---|---|---|
| CN | 106558039 A | * | 4/2017 |
| CN | 106558039 A | | 4/2017 |
| CN | 106920146 A | | 7/2017 |
| CN | 107343151 A | | 11/2017 |
| CN | 107705248 A | | 2/2018 |
| CN | 107730445 A | | 2/2018 |
| CN | 107808137 A | * | 3/2018 |
| CN | 107808137 A | | 3/2018 |
| CN | 107967677 A | | 4/2018 |
| CN | 107977927 A | | 5/2018 |
| CN | 108830783 A | | 11/2018 |
| JP | 2013162451 A | | 8/2013 |
| JP | 2014000244 A | | 1/2014 |
| JP | 2014002445 A | | 1/2014 |

OTHER PUBLICATIONS

International Search Report in the international application No. PCT/CN2018/124359, dated Mar. 27, 2019, 2 pgs.

First Office Action of the Chinese application No. 201810553047.9, dated Feb. 3, 2020, 22 pgs.

"A Computer-Based Method for the Assessment of Body-Image Distortions in Anorexia-Nervosa Patients", Dec. 2001, Daniel Harari, Miriam Furst, Nahum Hiryati, Asaf Caspi and Michael Davidson, IEEE Transactions on Information Technology in Biomedicine, US, IEEE, vol. 5, No. 4, 10 pgs.

First Office Action of the Japanese application No. 2020-516530, dated May 11, 2021, 6 pgs.

* cited by examiner

IMAGE PROCESSING METHOD, TERMINAL DEVICE, AND COMPUTER STORAGE MEDIUM

CROSS REFERENCE TO RELATED APPLICATIONS

This is a continuation of International Patent Application No. PCT/CN2018/124359, filed on Dec. 27, 2018, which claims priority to Chinese Patent Application No. 201810553047.9, filed on May 31, 2018. The disclosures of International Patent Application No. PCT/CN2018/124359 and Chinese Patent Application No. 201810553047.9 are hereby incorporated by reference in their entireties.

BACKGROUND

With the rapid development of Internet technologies, various image processing tools have emerged, which may process a character in an image. For example, "leg slimming" and "leg stretching", etc. are performed on a target character in the image to make the figure of the character more perfect. However, such an image processing operation requires manual operation of an operator, and a better adjustment effect may be achieved by means of multiple adjustment operations.

SUMMARY

The present application relates to image processing techniques, and in particular, to image processing methods and apparatuses, and computer storage mediums.

To solve an existing technical problem, embodiments of the present application provide image processing methods and apparatuses, and computer storage mediums.

To achieve the foregoing objective, the technical solutions in the embodiments of the present application are implemented as follows.

The embodiments of the present application provide an image processing method, including: obtaining a first image, identifying a target object in the first image, and obtaining body detection information of the target object; obtaining first detection information related to a leg region of the target object in the body detection information; and performing image deformation processing on the leg region corresponding to the first detection information to generate a second image.

The embodiments of the present application further provide a computer-readable storage medium, having computer instructions stored thereon, where the instructions, when being executed by a processor, causes the processor to implement operations of the image processing method in the embodiments of the present application.

The embodiments of the present application further provide a terminal device, including: a processor, and a processor configured to store instructions executable by the processor. The processor, upon execution of the instructions, is configured to implement operations of the image processing method in the embodiments of the present application.

It should be understood that the general description above and the detailed description below are merely exemplary and explanatory, and are not intended to limit the present disclosure.

DETAILED DESCRIPTION

The present application is further described below in detail with reference to the accompanying drawings and specific embodiments.

It should be noted that in the embodiments of the present disclosure, "and/or," describing the association relationship of the associated objects, indicates that there may be three relationships, for example, A and/or B may indicate that there are three cases where A exists separately, A and B exist at the same time, and B exists separately.

Figure 1:
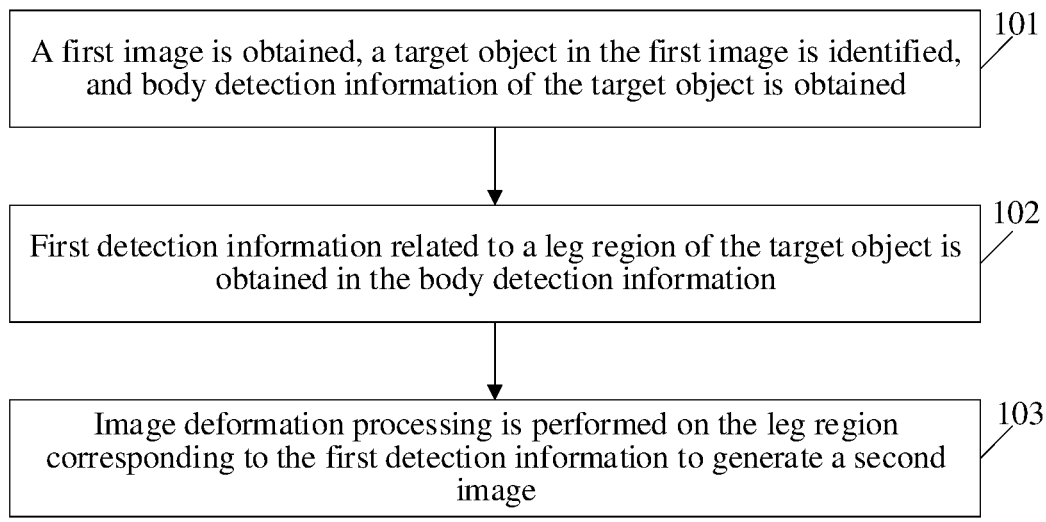
FIG. 1 is a schematic flowchart of an image processing method according to embodiments of the present application.

Embodiments of the present application provide an image processing method. FIG. 1 is a schematic flowchart of an image processing method according to embodiments of the present application. As shown in FIG. 1, the method includes the following operations.

At block 101, a first image is obtained, a target object in the first image is identified, and body detection information of the target object is obtained.

At block 102, first detection information related to a leg region of the target object in the body detection information is obtained.

At block 103, image deformation processing is performed on the leg region corresponding to the first detection information to generate a second image.

In the embodiments, the image processing method is applied to an image processing apparatus. The image processing device may be located in a mobile terminal such as a mobile phone, a tablet computer, a notebook computer, or in a terminal such as a desktop computer or an all-in-one computer.

The image processing method of the embodiments performs image processing on a first image, and first a target object in the first image is identified, where the target object, as a to-be-processed object, may be a real person, which may be understood as a real character in the image. In other embodiments, the target object may also be a virtual character.

In the embodiments, the body detection information includes body contour point information and/or body key point information. The body contour point information includes coordinate information of a body contour point. The body key point information includes coordinate information of a body key point. The body contour point represents a body contour of the target object, that is, the body contour edge of the target object is formed by the coordinate information of the body contour point. The body key point represents a key point of the bone of the target object, that is, the main bones of the target object are formed by the coordinate information of the body key points and connecting the body key points. The body contour point includes a leg contour point. The body contour point information includes leg contour point information. The leg contour point information includes coordinate information of the leg contour point.

In the embodiments, performing the image deformation processing on the leg region corresponding to the first detection information includes: performing stretching and/or compression processing on the leg region corresponding to the leg contour point information and/or the leg key point information. That is, in the embodiments, deformation processing is mainly performed on the leg region of the target object, and the processing modes mainly include compression processing (such as "getting thinner") or stretching processing (such as "getting fatter"), and "lengthening" or "shortening" processing of the leg region.

For the "getting thinner" processing of the leg region, in some embodiments, obtaining the first detection information related to the leg region of the target object in the body detection information includes: obtaining leg contour point information and/or leg key point information corresponding to the leg region of the target object in the body contour point information and/or body key point information. That is, the first detection information includes leg contour point information and/or leg key point information corresponding to the leg region of the target object.

Here, the leg contour point information includes first leg contour point information and second leg contour point information. The first leg contour point information corresponds to an outer leg contour. The second leg contour point information corresponds to an inner leg contour.

Performing the image deformation processing on the leg region corresponding to the first detection information includes: performing compression processing on the outer leg contour for the leg region corresponding to the leg contour point information and/or the leg key point information in a direction with the outer leg contour facing the inner leg contour, and performing compression processing on the inner leg contour in a direction with the inner leg contour facing the outer leg contour; or performing stretching processing on the outer leg contour in the direction with the inner leg contour facing the outer leg contour, and performing stretching processing on the inner leg contour in the direction with the outer leg contour facing the inner leg contour.

Specifically, in the embodiments, an image deformation algorithm is used to perform compression or stretching processing on the leg region, and specifically, compression or stretching processing is performed on the leg region in the first image along the leg width direction. Taking the compression processing of the leg region as an example, specifically, the width of the leg region is compressed to achieve the effect of leg slimming. In actual applications, the leg contour includes an outer leg contour and an inner leg contour. The outer leg contour corresponds to the outer side of the leg, and the inner leg contour corresponds to the inner side of the leg. For the compression processing of the leg region, compression processing is performed in the direction with the outer leg contour facing the inner leg contour, and compression processing is performed in the direction with the inner leg contour facing the outer leg contour, thereby shortening the width of the leg region, i.e., shortening the distance between edges of both sides of the leg region, which is the distance from any point on the outer leg contour to the inner leg contour. The stretching processing of the leg region is opposite to the compression processing, and details are not described herein repeatedly.

In other implementations, performing the image deformation processing on the leg region corresponding to the first detection information further includes: determining a center line of the leg region according to the first leg contour point information and the second leg contour point information; performing compression processing on the leg region corresponding to the leg contour point information in a direction with the outer and inner leg contours facing the center line, respectively, thereby shortening the width of the leg region, i.e., shortening the distance between edges of both sides of the leg region, which is the distance from any one of points on the outer leg contour to the inner leg contour; or, performing stretching processing on the leg region corresponding to the leg contour point information in a direction with the center line facing the outer and inner leg contours, respectively.

In the embodiments, for the "lengthening" or "shortening" processing of the leg region, on the one hand, the "lengthening" or "shortening" processing is performed on a shank region, and on the other hand, the ratio of the leg is increased or decreased by raising or lowering the "waist line", where the "waist line", as the dividing line of the body ratio, is a reference line for calculating the ratio of the upper body to the lower body. In actual applications, the shortest distance between the contour points on both sides of the waist may be called the "waist line".

In some embodiments, the leg contour point information includes third leg contour point information corresponding to a shank contour; the leg key point information includes first leg key point information corresponding to a shank region; and performing the image deformation processing on the leg region corresponding to the first detection information includes: performing stretching processing on the shank region corresponding to the third leg contour point information and/or the first leg key point information in a first direction, or performing compression processing in a second direction opposite to the first direction.

Specifically, the shank region is a region from the knee to the ankle. The third leg contour point information corresponds to an outer contour and an inner contour of the shank region. In the embodiments, an image deformation algorithm is used to perform stretching or compression processing on the shank region according to the leg direction. Here, the leg direction includes a first direction and a second direction. The first direction is a direction in which the knee points toward the foot. The second direction is a direction in which the foot points toward the knee. Then an image deformation algorithm is used to perform stretching processing on the shank region according to the first direction, or perform compression processing according to the second direction, thereby lengthening or shortening the length of the shank.

Figure 2:
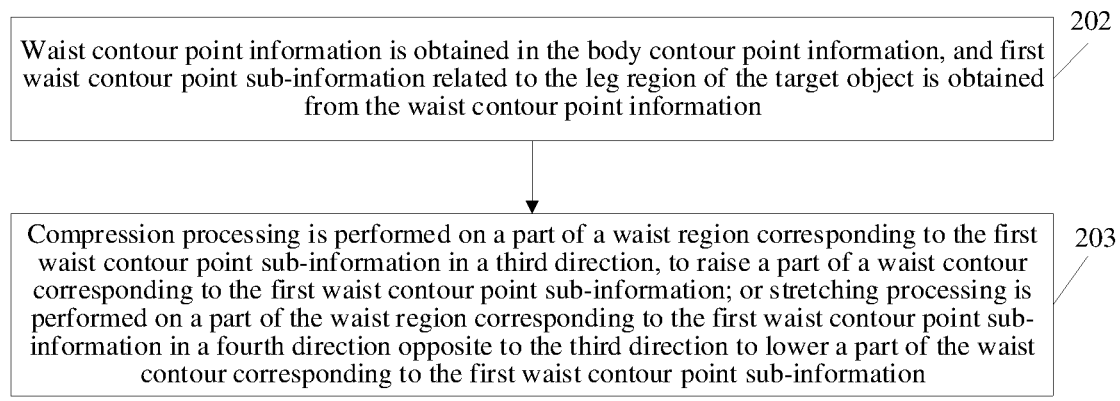
FIG. 2 is another schematic flowchart of an image processing method according to embodiments of the present disclosure.

FIG. 2 is another schematic flowchart of an image processing method according to some embodiments of the present disclosure. As illustrated in FIG. 2, in some embodiments, the operation 102 that first detection information related to a leg region of the target object in the body detection information is obtained as described in FIG. 1 may include the following operation.

At block 202, waist contour point information is obtained in the body contour point information, and first waist contour point sub-information related to the leg region of the target object is obtained from the waist contour point information.

In some embodiments, the operation 103 that image deformation processing is performed on the leg region corresponding to the first detection information as described in FIG. 1 may include the following operation.

At block 203, compression processing is performed on a part of a waist region corresponding to the first waist contour point sub-information in a third direction, to raise a part of a waist contour corresponding to the first waist contour point sub-information; or stretching processing is performed on a part of the waist region corresponding to the first waist contour point sub-information in a fourth direction opposite to the third direction to lower a part of the waist contour corresponding to the first waist contour point sub-information.

Specifically, as the first waist contour point sub-information related to the leg region, in some embodiments, the waist region is divided into upper and lower bodies by using the "waist line" (the "waist line" is the reference line corresponding to the minimum width of the waist) as the dividing line, and the waist contour point information corresponding to the lower body, i.e., the first waist contour point sub-information is the waist contour point information of the lower body. In the embodiments, in order to increase or decrease the ratio of the leg, the ratio of the upper body to the lower body is changed by changing the "waist line". For example, the mode of raising the "waist line" may be used for decreasing the ratio of the upper body, and increasing the ratio of the lower body, thereby visually stretching the ratio of the leg.

In actual applications, performing the compression processing on a part of the waist region corresponding to the first waist contour point sub-information is specifically performing compression processing on a part of the waist region corresponding to the first waist contour point sub-information in a third direction by using an image deformation algorithm, where the third direction is a direction toward the head, or a direction having a specific acute angle with the direction of the head. It may be understood that when the direction of the head is upward, the third direction is slanted upwards, so as to achieve the effect of raising the "waist line". Correspondingly, performing stretching processing on a part of the waist region corresponding to the first waist contour point sub-information is specifically performing stretching processing on a part of the waist region corresponding to the first waist contour point sub-information in a fourth direction by using an image deformation algorithm, where the fourth direction is a direction opposite the head, or an opposite direction having a specific acute angle with the direction of the head. It may be understood that when the direction of the head is upward, the fourth direction is slanted downwards, so as to achieve the effect of lowering the "waist line".

In the embodiments of the present application, performing the image deformation processing on the leg region corresponding to the first detection information includes: performing image deformation processing on the leg region corresponding to the first detection information according to a first type of deformation parameters corresponding to each point in the leg region, where the first type of deformation parameters changes with a change in a distance between a corresponding point in the leg region and a contour edge formed by the body contour point information.

Figure 3:
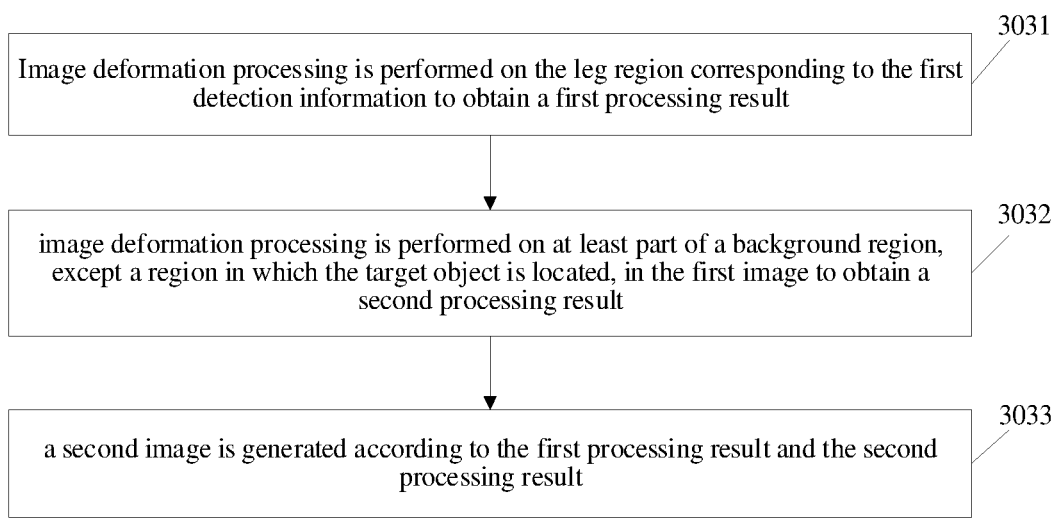
FIG. 3 is yet another schematic flowchart of an image processing method according to embodiments of the present disclosure.

FIG. 3 is yet another schematic flowchart of an image processing method according to some embodiments of the present disclosure. As illustrated in FIG. 3, the operation 103 that image deformation processing is performed on the leg region corresponding to the first detection information to generate a second image as described in FIG. 1 may include the following operation.

At block 3031, image deformation processing is performed on the leg region corresponding to the first detection information to obtain a first processing result.

At block 3032, image deformation processing is performed on at least part of a background region, except a region in which the target object is located, in the first image to obtain a second processing result.

At block 3033, a second image is generated according to the first processing result and the second processing result.

The operation 3033 that image deformation processing is performed on at least part of a background region except a region of the target object in the first image by using the image deformation algorithm includes: performing image deformation processing on the at least part of the background region according to a second type of deformation parameters corresponding to each point in the at least part of the background region, where the second type of deformation parameters changes exponentially with a change in a distance between a corresponding point in the at least part of the background region and a contour edge of the target object.

Specifically, the image deformation algorithm in the embodiments performs deformation processing according to a deformation parameter corresponding to the distance between each point and a contour edge by using the contour edge formed by the body contour point information of the target object as a reference, where points in the target object are understood as the points on the character, and corresponding deformation parameters are the first type of deformation parameters. Points outside the target object are the points in at least part of the background region, and corresponding deformation parameters are the second type of deformation parameters.

The first type of deformation parameters changes with a change in the distance between the point in the corresponding leg region and the contour edge. The second type of deformation parameters changes exponentially with a change in a distance between the point in at least part of the corresponding background region and the contour edge. It may be understood that, compared to the first type of deformation parameters, if the change in the distance between the point in the corresponding region and the contour edge is the same, the change amount of the second type of deformation parameters is larger, thereby reducing the impact on the background region, which makes the image processing effect more natural, especially the processing near the contour edge smoother and more natural.

Standard parameters are also configured in the image deformation algorithm of the embodiments of the present application. As implementations, the standard parameters indicate parameters satisfied by the leg region of the processed target object, that is, when the leg region is processed to satisfy the standard parameters by using the image deformation algorithm, the processing of the leg region is terminated. As other implementations, the standard parameters indicate the adjustment ratio of the leg region of the target object, that is, when the leg region is processed by using the image deformation algorithm, the adjustment change amount of the leg region satisfies the adjustment ratio.

The image processing method according to the embodiments of the present application is described below with reference to a specific embodiment.

If a user desires to adjust the leg region of a character in the first image, the leg region is adjusted by means of a terminal-based operation, such as an input operation for a specific function key. The specific adjustment process includes: obtaining contour point information and/or key point information related to the leg region of the character, specifically including leg contour point information, leg key point information, waist contour point information, and waist key point information, etc. Image deformation processing is performed on the first image by using an image deformation algorithm. Specifically, compression and/or stretching processing is performed on the leg region and/or a part of the waist region of the target object in the first image according to the standard parameters configured in the image deformation algorithm, so that the processed leg region and a part of the waist region satisfy the standard parameters. For example, if the width of a thigh region of the target object is larger than a parameter in the standard parameters corresponding to the thigh region, the compression processing is performed on the thigh region. For another example, if the leg length of the target object is smaller than a parameter in the standard parameters corresponding to the leg length, the "lengthening" processing is performed on the shank region, and/or the compression processing is performed on a part of the waist region, etc. A second image is further generated according to a processing result of the image deformation processing.

By adopting the technical solutions of the embodiments of the present application, the body detection information of the target object in the image is obtained, and the image deformation processing is performed on the leg region by using the image deformation algorithm according to the body detection information, automatic adjustment of the leg region of the target object may be implemented, without the need for multiple manual operations by the user, thereby greatly improving the user's operating experience.

Based on the foregoing implementations, in some embodiments, the method further includes: obtaining first detection information in the body detection information corresponding to a to-be-processed region of the target object, and performing image deformation processing on a region corresponding to the first detection information to generate a third image.

In the embodiments, obtaining first detection information in the body detection information corresponding to the to-be-processed region of the target object includes: obtaining contour point information in the body contour point information related to the to-be-processed region of the target object; and/or obtaining key point information in the body key point information related to the to-be-processed region of the target object.

In the embodiments, a chest or muscle-related region of the target object is mainly processed. Then, the contour point information related to the to-be-processed region of the target object includes at least one of the following: chest contour point information, abdominal contour point information, arm contour point information, leg contour point information, and back contour point information. The key point information related to the to-be-processed region of the target object includes at least one of the following: contour key point information, abdominal key point information, arm key point information, leg key point information, and back key point information, etc.

For the processing mode of the chest region, in some embodiments, the contour point information includes chest contour point information. The to-be-processed region is a chest region. Processing the first detection information includes: performing stretching or compression deformation processing on the chest region corresponding to the chest contour point information and/or chest key point information.

Specifically, contour points on both sides of the chest are identified according to the chest contour point information, and a center point of the chest is determined according to the contour points on both sides of the chest. A circular region is selected with the center point of the chest as the center of a circle and the distance from the center point to the contour point on both sides of the chest as the radius. The radius of the circular region is stretched and deformed outward with the center point as the center. Alternatively, the radius of the circular region is compressed and deformed inward. The image processing mode of the embodiments is particularly suitable for female objects. Image processing is performed on the chest of the female character to achieve the "chest enlargement" effect.

In the embodiments, performing the stretching or compression deformation processing on the chest region corresponding to the chest contour point information and/or the chest key point information includes: performing stretching or compression deformation processing on the chest region according to a first type of deformation parameters corresponding to each point in the chest region, where the first type of deformation parameters changes with a change in a distance between a point in the corresponding chest region and a contour edge of the target object.

For the processing mode of a muscle-related region, in the embodiments, performing the image deformation processing on the first detection information includes: identifying the type of a to-be-processed region corresponding to the body contour point information and/or body key point information; adding object information to the to-be-processed region according to the type of the to-be-processed region; or identifying object information in the to-be-processed region corresponding to the body contour point information, and adjusting a display attribute parameter corresponding to the object information.

Specifically, the processing of the muscle-related region in the embodiments of the present application includes two modes, i.e., "adding muscles" and "enlarging muscles". The so-called "adding muscles" refers to adding muscles in regions without muscles. The so-called "enlarging muscles" refers to the effect of enlarging the original muscles in regions with muscles.

On this basis, as the implementations, the type of the to-be-processed region corresponding to the contour point information is identified, and object information is added to the to-be-processed region according to the type of the to-be-processed region. The type of the to-be-processed region represents a part of the target object corresponding to the corresponding contour point information. It may be understood that parts such as the chest, abdomen, arms, legs, and back correspond to different types. Further, if the part has at least two sub-parts, the at least two sub-parts correspond to different types. For example, if the leg includes two sub-parts, i.e., the thigh and the shank, the two sub-parts correspond to different types.

Further, for the type of the to-be-processed region, object information corresponding to the type is added to the to-be-processed region, where the object information is shadow data representing the muscle region, that is, the corresponding shadow data is added to the to-be-processed region. For example, when the to-be-processed region is an abdominal region, the object information is the shadow data corresponding to the abdominal muscles, and the shadow data is added to the corresponding position of the abdominal region.

As other implementations, object information in the to-be-processed region corresponding to the contour point information and/or key point information is identified, and the display attribute parameter corresponding to the object information is adjusted.

Similar to the foregoing implementations, in the implementations, the object information represents the shadow data of the muscle region, that is, the muscle region in the to-be-processed region corresponding to the contour point information is identified. For example, when the to-be-processed region is the abdominal region, the muscle region in the abdominal region is identified. Further, the display attribute parameter corresponding to the object information is adjusted, and the display attribute parameter is specifically a contrast parameter, that is, the contrast of the object information is adjusted, specifically, the contrast of the object information is increased, thereby increasing the stereo degree of the muscle region, i.e., the effect of enlarging muscles.

Based on the foregoing implementations, in the embodiments, the body contour point information includes arm contour point information; the arm contour point information includes first arm contour point information and second arm contour point information; the first arm contour point information corresponds to an outer arm contour; the second arm contour point information corresponds to an inner arm contour; and performing the image deformation processing on a region corresponding to the first detection information includes: obtaining arm contour point information and/or arm key point information in the body contour point information corresponding to the arm region of the target object; performing compression processing on the outer arm contour for the arm region corresponding to the arm contour point information and/or the arm key point information in a direction with the outer arm contour facing the inner arm contour, and performing compression processing on the inner arm contour in a direction with the inner arm contour facing the outer arm contour; or performing stretching processing on the outer arm contour in the direction with the inner arm contour facing the outer arm contour, and performing stretching processing on the inner arm contour in the direction with the outer arm contour facing the inner arm contour.

In some embodiments, the body contour point information includes waist contour point information; the body key point information further includes waist key point information; and performing the image deformation processing on a region corresponding to the first detection information includes: determining a center line of the waist region according to the waist contour point information, and performing compression processing on the waist region corresponding to the waist contour point information and/or the waist key point information in a direction with the waist contours on both sides facing the center line; or performing stretching processing on the waist region corresponding to the waist contour point information and/or the waist key point information in a direction with the center line facing the waist contours on both sides.

Determining the center line of the waist region according to the waist contour point information includes: determining the center line of the waist region according to edges of both sides of the waist region represented by the waist contour point information; and performing compression processing in a direction with edges of both sides facing the center line, thereby shortening the width of the waist region, i.e., shortening a distance between edges of both sides of the waist region, which is the shortest distance from any one of points on the edge contour of one side of the waist to the edge contour of the other side of the waist.

In some embodiments, the image deformation algorithm in the embodiments of the present application uses different deformation parameters during image deformation processing for different parts of the body region. For example, image deformation processing for the leg region corresponds to the first deformation parameter. The compression processing for the arm region corresponds to the second deformation parameter. The image deformation processing for the waist region corresponds to the third deformation parameter. The first deformation parameter, the second deformation parameter, and the third deformation parameter are the same or different. For example, in some embodiments, the third deformation parameter is larger than the first deformation parameter.

Figure 4:
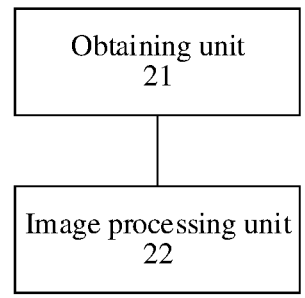
FIG. 4 is a schematic structural diagram of an image processing apparatus according to embodiments of the present application.

The embodiments of the present application further provide an image processing apparatus. FIG. 4 is a schematic structural diagram of an image processing apparatus according to embodiments of the present application. As shown in FIG. 4, the apparatus includes an obtaining unit 21 and an image processing unit 22, where the obtaining unit 21 is configured to: obtain a first image, identify a target object in the first image, and obtain body detection information of the target object; and obtain first detection information related to a leg region of the target object in the body detection information. The image processing unit 22 is configured to: perform image deformation processing on the leg region corresponding to the first detection information obtained by the obtaining unit 21 to generate a second image.

In the embodiments, the body detection information includes body contour point information and/or body key point information. The body contour point information includes coordinate information of a body contour point. The body key point information includes coordinate information of a body key point.

In some embodiments, the obtaining unit 21 is configured to obtain leg contour point information and/or leg key point information corresponding to the leg region of the target object in the body contour point information and/or body key point information.

In some embodiments, the image processing unit 22 is configured to perform stretching and/or compression processing on the leg region corresponding to the leg contour point information and/or the leg key point information.

In some embodiments, the leg contour point information includes first leg contour point information and second leg contour point information. The first leg contour point information corresponds to an outer leg contour. The second leg contour point information corresponds to an inner leg contour. The image processing unit 22 is configured to: perform compression processing on the outer leg contour for the leg region corresponding to the leg contour point information and/or the leg key point information in a direction with the outer leg contour facing the inner leg contour, and perform compression processing on the inner leg contour in a direction with the inner leg contour facing the outer leg contour; or perform stretching processing on the outer leg contour in the direction with the inner leg contour facing the outer leg contour, and perform stretching processing on the inner leg contour in the direction with the outer leg contour facing the inner leg contour.

In some embodiments, the leg contour point information includes third leg contour point information corresponding to a shank contour. The leg key point information includes first leg key point information corresponding to a shank region. The image processing unit 22 is configured to: perform stretching processing on the shank region corresponding to the third leg contour point information and/or the first leg key point information in a first direction, or perform compression processing in a second direction opposite to the first direction.

In some embodiments, the obtaining unit 21 is configured to obtain waist contour point information in the body contour point information, and obtain first waist contour point sub-information related to the leg region of the target object from the waist contour point information. The image processing unit 22 is configured to: perform compression processing on a part of a waist region corresponding to the first waist contour point sub-information in a third direction to raise a part of a waist contour corresponding to the first waist contour point sub-information; or perform stretching processing on a part of the waist region corresponding to the first waist contour point sub-information in a fourth direction opposite to the third direction to lower a part of the waist contour corresponding to the first waist contour point sub-information.

In some embodiments, the image processing unit 22 is configured to perform image deformation processing on the leg region corresponding to the first detection information according to a first type of deformation parameters corresponding to each point in the leg region, where the first type of deformation parameters changes with a change in a distance between a corresponding point in the leg region and a contour edge formed by the body contour point information.

In some embodiments, the image processing unit 22 is configured to: perform image deformation processing on the leg region corresponding to the first detection information to obtain a first processing result; perform image deformation processing on at least part of a background region except a region of the target object in the first image to obtain a second processing result; and generate a second image according to the first processing result and the second processing result.

In some embodiments, the image processing unit 22 is configured to perform image deformation processing on the at least part of the background region according to a second type of deformation parameters corresponding to each point in the at least part of the background region, where the second type of deformation parameters changes exponentially with a change in a distance between a corresponding point in the at least part of the background region and a contour edge of the target object.

In some embodiments, the obtaining unit 21 is configured to obtain contour point information in the body contour point information corresponding to the to-be-processed region of the target object.

In some embodiments, the contour point information includes chest contour point information. The to-be-processed region is a chest region. The image processing algorithm is an image deformation algorithm. The image processing unit 22 is configured to perform stretching deformation or compression processing on the chest region corresponding to the chest contour point information.

In some embodiments, the image processing unit 22 is configured to identify the type of a to-be-processed region corresponding to the body contour point information, and add object information to the to-be-processed region according to the type of the to-be-processed region; or identify object information in the to-be-processed region corresponding to the body contour point information by using an image processing algorithm, and adjust a display attribute parameter corresponding to the object information.

In some embodiments, the body contour point information includes arm contour point information. The arm contour point information includes first arm contour point information and second arm contour point information. The first arm contour point information corresponds to an outer arm contour. The second arm contour point information corresponds to an inner arm contour. The obtaining unit 21 is further configured to obtain arm contour point information in the body contour point information corresponding to the arm region of the target object, and further configured to obtain arm key point information in the body key point information corresponding to the arm region of the target object. The image processing unit 22 is configured to perform compression processing on the outer arm contour for the arm region corresponding to the arm contour point information and/or the arm key point information in a direction with the outer arm contour facing the inner arm contour, and perform compression processing on the inner arm contour in a direction with the inner arm contour facing the outer arm contour; or perform stretching processing on the outer arm contour in the direction with the inner arm contour facing the outer arm contour, and perform stretching processing on the inner arm contour in the direction with the outer arm contour facing the inner arm contour.

In some embodiments, the body contour point information includes waist contour point information. The image processing unit 22 is configured to: determine a center line of the waist region according to the waist contour point information, and perform compression processing on the waist region corresponding to the waist contour point information in a direction with the waist contours on both sides facing the center line; or perform stretching processing on the waist region corresponding to the waist contour point information in a direction with the center line facing the waist contours on both sides.

In the embodiments of the present application, in actual applications, the obtaining unit 21 and the image processing unit 22 in the image processing apparatus are implemented by a Central Processing Unit (CPU), a Digital Signal Processor (DSP), a Microcontroller Unit (MCU), or a Field-Programmable Gate Array (FPGA) in the terminal.

Figure 5:
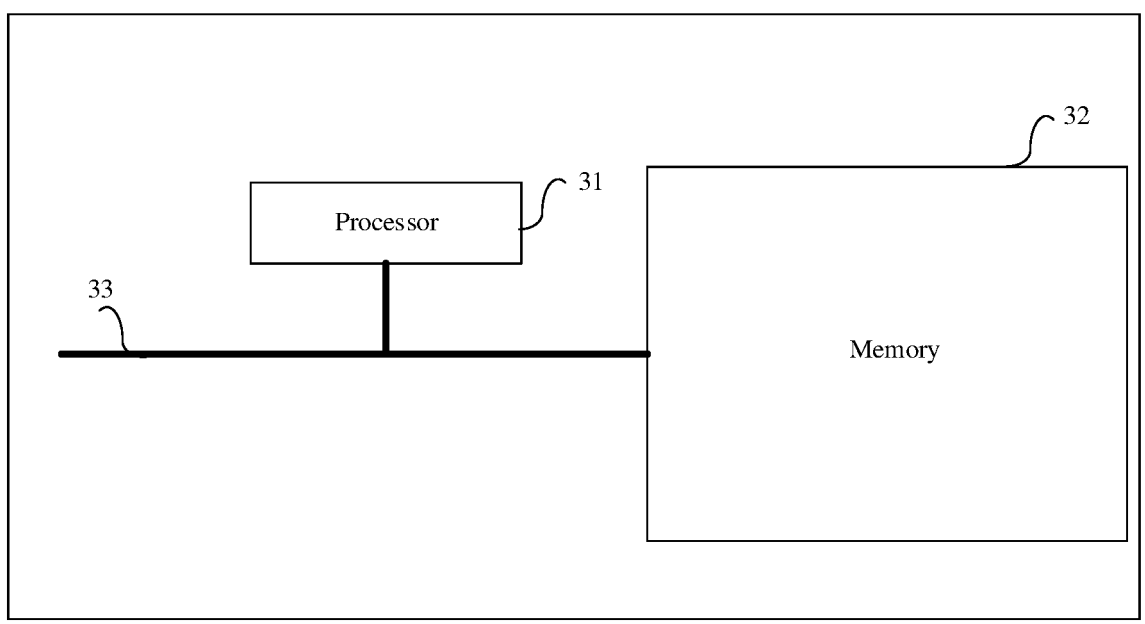
FIG. 5 is a schematic structural diagram of a hardware composition of an image processing apparatus according to embodiments of the present application.

The embodiments of the present application further provide an image processing apparatus. FIG. 5 is a schematic structural diagram of a hardware composition of the image processing apparatus according to the embodiments of the present application. As shown in FIG. 5, the image processing apparatus includes a memory 32, a processor 31, and a computer program that is stored in the memory 32 and may run on the processor 31. The image processing method according to any one of the foregoing claims in the embodiments of the present application is implemented when the program is executed by the processor 31.

It may be understood that various components in the image processing apparatus are coupled together by means of a bus system 33. It may be understood that the bus system 33 is configured to implement connection communication between these components. In addition to a data bus, the bus system 33 further includes a power bus, a control bus, and a status signal bus. However, for the sake of clarity, various buses are annotated as the bus system 33 in FIG. 5.

It may be understood that the memory 32 may be a volatile memory or a non-volatile memory, or both. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc, or a Compact Disc Read-Only Memory (CD- ROM). The magnetic surface memory is a magnetic disc memory or a magnetic tape memory. The volatile memory is a Random Access Memory (RAM) that serves as an external cache. By way of example instead of limitation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synclink Dynamic Random Access Memory (SLDRAM), and a Direct Rambus Random Access Memory (DRRAM). The memory 32 described in the embodiments of the present application is intended to include but is not limited to these memories and any other suitable types of memories.

The method disclosed in the embodiments of the present application above may be applied to the processor 31, or implemented by the processor 31. The processor 31 may be an integrated circuit chip, and has a signal processing capability. In an implementation process, operations in the method above are completed by using an integrated logic circuit of hardware in the processor 31 or instructions in a form of software. The processor 31 is a general-purpose processor, a DSP, another programmable logic component, a discrete gate or a transistor logic component, a discrete hardware component, or the like. The processor 31 may implement or execute the methods, steps, and logical block diagrams disclosed in the embodiments of the present application. The general-purpose processor is a microprocessor, any conventional processor, or the like. The operations of the method disclosed with reference to the embodiments of the present application are directly implemented by a hardware decoding processor, or are implemented by using a combination of hardware and software modules in the decoding processor. The software module is located in a storage medium, and the storage medium is located in the memory 32. The processor 31 reads information in the memory 32 and completes the operations of the method above with reference to hardware thereof.

It should be noted that, when the image processing apparatus provided in the foregoing embodiments performs image processing, division of the program modules above is merely used as an example for description. In actual application, the processing above is allocated to different program modules according to requirements; that is, an internal structure of the apparatus is divided into different program modules, so as to complete all or some of the processing above. In addition, the image processing apparatus provided in the foregoing embodiments and the embodiments of the image processing method belong to a same concept. For a specific implementation process, reference is made to the method embodiments. Details are not described here again.

In exemplary embodiments, the embodiments of the present application further provide a computer-readable storage medium, such as the memory 32 including the computer program. The computer program is executed by the processor 31 of the image processing apparatus, to complete the operations of the method above. The computer-readable storage medium is a memory such as FRAM, ROM, PROM, EPROM, EEPROM, Flash Memory, magnetic surface memory, optical disc, or CD-ROM, or a device including one or any combination of the foregoing memories, such as mobile phones, computers, tablet devices, personal digital assistants, etc.

The embodiments of the present application further provide a computer-readable storage medium, having computer instructions stored thereon. The image processing method according to any one of the foregoing claims in the embodiments of the present application is implemented when the instructions are executed by the processor.

The embodiments of the present application further provide a computer program product, including computer-executable instructions, where the computer-executable instructions are executed to implement operations of the image processing method according to any one of the foregoing claim in the embodiments of the present application.

In several embodiments provided in the present application, it should be understood that the disclosed apparatus and method are implemented in another manner. The described device embodiments are merely exemplary. For example, the unit division is merely logical function division. In actual implementation, there may be another division manner. For example, multiple units or components are combined, integrated into another system, or some features are ignored, or not performed. In addition, the displayed or discussed components may be mutually coupled, or directly coupled, or communicatively connected by means of some interfaces, or indirectly coupled or communicatively connected by a device or unit, and may be electrically, mechanically, or in another form.

The foregoing units described as separate parts may or may not be physically separate, and parts displayed as units may or may not be physical units, may be located in one place, or may be distributed on multiple network units. Some or all of the units may be selected according to actual requirements to implement the objectives of the solutions in the embodiments.

In addition, functional units in the embodiments of the present application may be integrated into one processing unit, or may be separately used as one unit, or two or more units may be integrated into one unit. The integrated unit can be implemented in the form of hardware or in the form of hardware plus software functional units.

A person of ordinary skill in the art may understand that all or some steps for implementing the foregoing method embodiments are achieved by a program by instructing relevant hardware. The foregoing program may be stored in a computer readable storage medium. When the program is executed, steps including the foregoing method embodiments are performed. Moreover, the foregoing storage medium includes any medium that may store program codes, such as a ROM, a RAM, a magnetic disc, or an optical disc.

Alternatively, when implemented in the form of a software functional module and sold or used as an independent product, the integrated unit of the present application may also be stored in a computer-readable storage medium. Based on such an understanding, the technical solutions of the embodiments of the present application essentially or the part contributing to the prior art may be implemented in a form of a software product. The computer software product is stored in one storage medium and includes several instructions for instructing a computer device (which may be a personal computer, a server, or a network device, etc.) to execute all or part of the methods described in the embodiments of the present application. The foregoing storage medium includes any medium that may store program code, such as a mobile storage device, a ROM, a RAM, a magnetic disc, or an optical disc.

The above are only specific implementation modes of the present application, but the scope of protection of the present application is not limited thereto. Any person skilled in the art could easily conceive that changes or substitutions made within the technical scope disclosed in the present application should be included in the scope of protection of the present application. Therefore, the scope of protection of the present application should be determined by the scope of protection of the appended claims.

The invention claimed is:

1. An image processing method, applied to a terminal device, comprising:
   obtaining a first image, identifying a target object in the first image, and obtaining body detection information of the target object, wherein the body detection information comprises at least one of body contour point information or body key point information;
   obtaining first detection information related to a leg region of the target object in the body detection information, wherein the first detection information comprises at least one of leg contour point information corresponding to the leg region of the target object in the body contour point information, or leg key point information corresponding to the leg region of the target object in the body key point information; and
   performing image deformation processing on the leg region corresponding to the first detection information to generate a second image,
   wherein the leg contour point information comprises third leg contour point information corresponding to a shank contour; and the leg key point information comprises first leg key point information corresponding to a shank region; and
   wherein performing the image deformation processing on the leg region corresponding to the first detection information comprises:
      performing stretching processing on a shank region corresponding to at least one of the third leg contour point information or the first leg key point information in a first direction, or performing compression processing on the shank region corresponding to at least one of the third leg contour point information or the first leg key point information in a second direction opposite to the first direction.

2. The method according to claim 1, wherein
   the body contour point information comprises coordinate information of a body contour point; and
   wherein the body key point information comprises coordinate information of a body key point.

3. The method according to claim 1, wherein the leg contour point information comprises first leg contour point information and second leg contour point information; the first leg contour point information corresponding to an outer leg contour, and the second leg contour point information corresponding to an inner leg contour; and
   wherein performing the image deformation processing on the leg region corresponding to the first detection information further comprises:
   performing, for the leg region corresponding to at least one of the leg contour point information or the leg key point information, compression processing on the outer leg contour in a direction from the outer leg contour towards the inner leg contour, and performing compression processing on the inner leg contour in a direction from the inner leg contour towards the outer leg contour; or performing stretching processing on the outer leg contour in the direction from the inner leg contour towards the outer leg contour, and performing stretching processing on the inner leg contour in the direction from the outer leg contour towards the inner leg contour.

4. The method according to claim 1, wherein obtaining the first detection information related to the leg region of the target object in the body detection information further comprises:
   obtaining waist contour point information in the body contour point information, and obtaining from the waist contour point information first waist contour point sub-information related to the leg region of the target object; and
   wherein performing the image deformation processing on the leg region corresponding to the first detection information further comprises:
      performing compression processing on a part of a waist region corresponding to the first waist contour point sub-information in a third direction to raise a part of a waist contour corresponding to the first waist contour point sub-information; or performing stretching processing on a part of the waist region corresponding to the first waist contour point sub-information in a fourth direction opposite to the third direction to lower the part of the waist contour corresponding to the first waist contour point sub-information.

5. The method according to claim 1, wherein performing the image deformation processing on the leg region corresponding to the first detection information further comprises:
   performing image deformation processing on the leg region corresponding to the first detection information according to a first type of deformation parameters corresponding to each point in the leg region,
   wherein the first type of deformation parameters varies with a distance between a corresponding point in the leg region and a contour edge formed by the body contour point information.

6. The method according to claim 1, wherein performing the image deformation processing on the leg region corresponding to the first detection information to generate the second image further comprises:
   performing image deformation processing on the leg region corresponding to the first detection information to obtain a first processing result;
   performing image deformation processing on at least part of a background region, except a region in which the target object is located, in the first image to obtain a second processing result; and
   generating the second image according to the first processing result and the second processing result.

7. The method according to claim 6, wherein performing the image deformation processing on the at least part of the background region, except the region in which the target object is located, in the first image to obtain the second processing result comprises:
   performing the image deformation processing on the at least part of the background region according to a second type of deformation parameters corresponding to each point in the at least part of the background region;
   wherein the second type of deformation parameters varies exponentially with a distance between a corresponding point in the at least part of the background region and a contour edge of the target object.

8. A terminal device, comprising:
a processor; and
a memory configured to store instructions executable by the processor,
wherein the processor is configured to:
obtain a first image, identify a target object in the first image, and obtain body detection information of the target object, wherein the body detection information comprises at least one of body contour point information or body key point information;
obtain first detection information related to a leg region of the target object in the body detection information, wherein the first detection information comprises at least one of leg contour point information corresponding to the leg region of the target object in the body contour point information, or leg key point information corresponding to the leg region of the target object in the body key point information; and
perform image deformation processing on the leg region corresponding to the first detection information to generate a second image,
wherein the leg contour point information comprises third leg contour point information corresponding to a shank contour; and the leg key point information comprises first leg key point information corresponding to a shank region; and
wherein the processor is further configured to:
perform stretching processing on a shank region corresponding to at least one of the third leg contour point information or the first leg key point information in a first direction, or perform compression processing on the shank region corresponding to at least one of the third leg contour point information or the first leg key point information in a second direction opposite to the first direction.

9. The terminal device according to claim 8, wherein the body contour point information comprises coordinate information of a body contour point; and
wherein the body key point information comprises coordinate information of a body key point.

10. The terminal device according to claim 8, wherein the leg contour point information comprises first leg contour point information and second leg contour point information; the first leg contour point information corresponding to an outer leg contour; the second leg contour point information corresponding to an inner leg contour; and
wherein the processor is further configured to:
perform, for the leg region corresponding to at least one of the leg contour point information or the leg key point information, compression processing on the outer leg contour in a direction from the outer leg contour towards the inner leg contour, and perform compression processing on the inner leg contour in a direction from the inner leg contour towards the outer leg contour; or perform stretching processing on the outer leg contour in the direction from the inner leg contour towards the outer leg contour, and perform stretching processing on the inner leg contour in the direction from the outer leg contour towards the inner leg contour.

11. The terminal device according to claim 8, wherein the processor is further configured to:
obtain waist contour point information in the body contour point information, and obtain from the waist contour point information first waist contour point sub-information related to the leg region of the target object; and
perform compression processing on a part of a waist region corresponding to the first waist contour point sub-information in a third direction to raise a part of a waist contour corresponding to the first waist contour point sub-information; or perform stretching processing on a part of the waist region corresponding to the first waist contour point sub-information in a fourth direction opposite to the third direction to lower the part of the waist contour corresponding to the first waist contour point sub-information.

12. The terminal device according to claim 8, wherein the processor is further configured to perform image deformation processing on the leg region corresponding to the first detection information according to a first type of deformation parameters corresponding to each point in the leg region,
wherein the first type of deformation parameters varies with a distance between a corresponding point in the leg region and a contour edge formed by the body contour point information.

13. The terminal device according to claim 8, wherein the processor is further configured to:
perform image deformation processing on the leg region corresponding to the first detection information to obtain a first processing result;
perform image deformation processing on at least part of a background region, except a region in which the target object is located, in the first image to obtain a second processing result; and
generate the second image according to the first processing result and the second processing result.

14. The terminal device according to claim 13, wherein the processor is further configured to perform the image deformation processing on the at least part of the background region according to a second type of deformation parameters corresponding to each point in the at least part of the background region,
wherein the second type of deformation parameters varies exponentially with a distance between a corresponding point in the at least part of the background region and a contour edge of the target object.

15. A non-transitory computer-readable storage medium, having computer instructions stored thereon, wherein the computer instructions when being executed by a processor, implement an image processing method, the method comprising:
obtaining a first image, identifying a target object in the first image, and obtaining body detection information of the target object, wherein the body detection information comprises at least one of body contour point information or body key point information;
obtaining first detection information related to a leg region of the target object in the body detection information, wherein the first detection information comprises at least one of leg contour point information corresponding to the leg region of the target object in the body contour point information, or leg key point information corresponding to the leg region of the target object in the body key point information; and
performing image deformation processing on the leg region corresponding to the first detection information to generate a second image,
wherein the leg contour point information comprises third leg contour point information corresponding to a shank contour; and the leg key point information comprises first leg key point information corresponding to a shank region; and wherein performing the image deformation processing on the leg region corresponding to the first detection information comprises:

performing stretching processing on a shank region corresponding to at least one of the third leg contour point information or the first leg key point information in a first direction, or performing compression processing on the shank region corresponding to at least one of the third leg contour point information or the first leg key point information in a second direction opposite to the first direction.

* * * * *